(12) United States Patent
Korhonen et al.

(10) Patent No.: US 9,143,919 B2
(45) Date of Patent: Sep. 22, 2015

(54) IPV6 ANYCAST-BASED LOAD BALANCING AND REDIRECTION FUNCTIONALITY FOR PMIPV6

(75) Inventors: Jouni Korhonen, Riihimäki (FI); Basavaraj Patil, Coppell, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 45 days.

(21) Appl. No.: 13/201,861

(22) PCT Filed: Feb. 25, 2010

(86) PCT No.: PCT/EP2010/052433
§ 371 (c)(1),
(2), (4) Date: Jan. 30, 2012

(87) PCT Pub. No.: WO2010/097445
PCT Pub. Date: Sep. 2, 2010

(65) Prior Publication Data
US 2012/0120872 A1 May 17, 2012

Related U.S. Application Data

(60) Provisional application No. 61/202,429, filed on Feb. 27, 2009.

(51) Int. Cl.
*H04W 4/00* (2009.01)
*H04W 8/12* (2009.01)
*H04W 8/06* (2009.01)
*H04W 80/04* (2009.01)
*H04W 88/18* (2009.01)

(52) U.S. Cl.
CPC ................ *H04W 8/12* (2013.01); *H04W 8/065* (2013.01); *H04W 80/04* (2013.01); *H04W 88/182* (2013.01)

(58) Field of Classification Search
CPC .............................. H04W 28/08; H04W 36/22
USPC ..................... 455/432.1; 379/211.02; 370/328
See application file for complete search history.

(56) References Cited

U.S. PATENT DOCUMENTS

2002/0064271 A1 * 5/2002 Stumer ................... 379/211.02
2004/0203749 A1 * 10/2004 Iyer et al. ................... 455/432.1
2010/0020747 A1 * 1/2010 Xia et al. ...................... 370/328

FOREIGN PATENT DOCUMENTS

| CN | 101212397 A | 7/2008 |
|----|-------------|--------|
| CN | 101316228 A | 12/2008 |

(Continued)

OTHER PUBLICATIONS

S. Gundavelli et al., "Proxy Mobile IPv6", Network Working Group, RFC 5213, Aug. 2008, pp. 1-93.

(Continued)

*Primary Examiner* — Helal A Algahaim
*Assistant Examiner* — Mahmoud Ismail
(74) *Attorney, Agent, or Firm* — Squire Patton Boggs (US) LLP

(57) ABSTRACT

A method, apparatus, computer program, and system is provided to redirect an internet protocol mobility session establishment request. According to certain embodiments of the invention, the request message is redirected from an original local mobility anchor ("LMA") to an alternative LMA. According to certain embodiments of the invention, this redirection provides load balancing between the LMAs.

26 Claims, 9 Drawing Sheets

(56) References Cited

FOREIGN PATENT DOCUMENTS

| CN | 101483636 A | 7/2009 |
|---|---|---|
| CN | 101534501 A | 9/2009 |
| EP | 1912400 A1 | 4/2008 |

OTHER PUBLICATIONS

D. Johnson et al., "Reserved IPv6 Subnet Anycast Addresses", Network Working Group, RFC 2526, Mar. 1999, pp. 1-7.

M. Kulkarni et al., "Mobile IPv4 Dynamic Home (HA) Assignment", RFC 4433, Mar. 2006, pp. 1-26.

International Search Report and Written Opinion application No. PCT/EP2010/052433 dated Jul. 6, 2010.

Office Action dated Aug. 29, 2014, issued in corresponding Chinese Patent Application No. 201080018663.6 (with English translation).

English translation of Office Action dated Dec. 13, 2013, issued in corresponding CN patent application No. 201080018663.6.

\* cited by examiner

IPV6 ANYCAST-BASED LOAD BALANCING AND REDIRECTION FUNCTIONALITY FOR PMIPV6

CROSS REFERENCE TO RELATED APPLICATIONS

This application claims priority of U.S. Provisional Patent Application Ser. No. 61/202,429, filed on Feb. 27, 2009. The subject matter of the earlier filed application is hereby incorporated by reference.

BACKGROUND

1. Field

The present invention relates generally to communication systems, and particularly to Internet Engineering Task Force (IETF) Internet Protocol (IP) mobility and Third Generation Partnership Project (3GPP) Evolved Packet Core communication systems using Proxy Mobile IPv6 (PMIPv6) based protocols. The present invention also relates to Worldwide Interoperability for Microwave Access (WiMAX) networks which use PMIPv6 as a network-based mobility protocol.

2. Description of the Related Art

PMIPv6 is a network-based mobility management protocol which enables IP mobility for a mobile node without requiring the mobile node's participation in any mobility-related signaling. According to the PMIPv6 protocol, the core functional entities in the infrastructure of the PMIPv6 protocol are the Local Mobility Anchor (LMA) and the Mobile Access Gateway (MAG). When a mobile node enters a PMIPV6 domain, the MAG, after identifying the mobile node and acquiring its identity, determines if the mobile node is authorized for the network-based mobility management service. If the MAG determines that the mobile node is authorized for network-based mobility service, the MAG will determine an address of an LMA, and send a signaling request message to the LMA to establish an IP session. If the selected LMA is capable of serving the mobile node, the LMA will send an acknowledgment message to the MAG, and a bi-directional tunnel is established between the MAG and the LMA.

However, there are situations where the selected LMA is not capable of serving the mobile node. For example, the LMA may not be able to allocate any home network prefixes for the mobile node due to insufficient resources. In these situations, the LMA must reject the request message of the MAG, and the MAG must locate another LMA.

In these situations, there is no mechanism where the selected LMA may redirect the request message to an alternative LMA which may be capable of serving the mobile node. There is no known mechanism, or defined support in the PMIPv6 protocol, for the redirection of an IP session establishment to an alternative LMA and for load-balancing between a set of LMAs.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
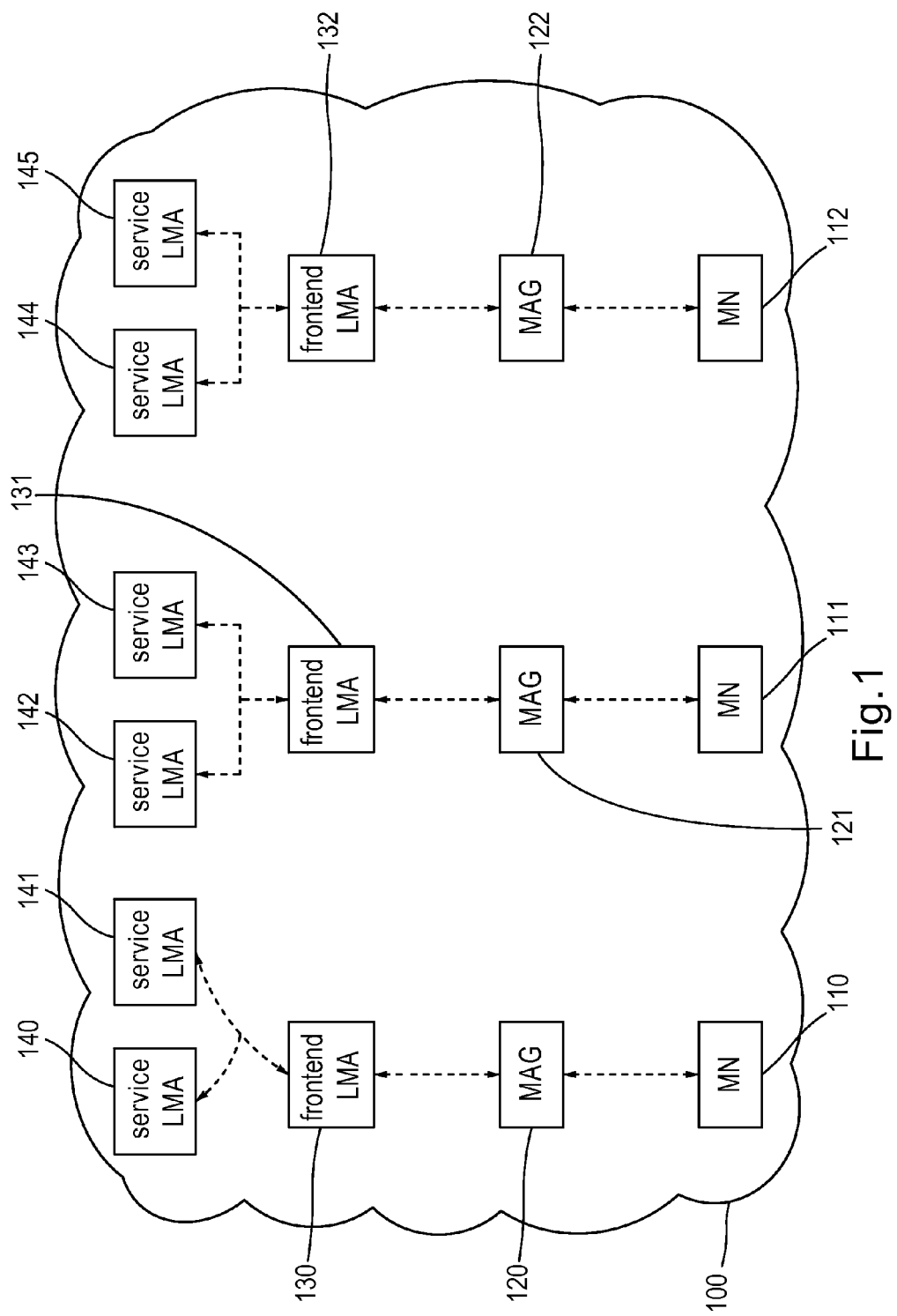
FIG. 1 illustrates an example embodiment of a communication system according to the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

In addition, while the term "message" has been used in the description of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to the PMIPv6 protocol, the LMA is responsible for maintaining a mobile node's reachability state and is the topological anchor point for the mobile node's home network prefix(es). The MAG is responsible for detecting the mobile node's movements to and from the access link and for initiating binding registrations to the mobile node's LMA. In a PMIPv6 domain, there can be multiple LMAs, each serving a different group of mobile nodes.

When a mobile node enters a PMIPV6 domain, the MAG, after identifying the mobile node, acquiring its identity, and determining that the mobile node is authorized for network-based mobility service, selects a LMA and sends a Proxy Binding Update (PBU) message to the LMA, which can include an MN-Identifier for identifying the mobile node.

Upon accepting the PBU message, the LMA sends a Proxy Binding Acknowledgment (PBA) message, which can include the mobile node's home network prefix(es). The LMA also creates a Binding Cache entry and sets up its endpoint of a bi-directional tunnel to the MAG. The MAG, upon receiving the PBA message, sets up its endpoint of the bi-directional tunnel to the LMA, and also sets up the forwarding for the mobile node's traffic.

Once the bi-directional tunnel between the MAG and the LMA is set up, the LMA receives any packets that are sent to the mobile node by any node in or outside the Proxy Mobile IPv6 domain and forwards these received packets to the MAG through the bi-directional tunnel. The MAG, after receiving the packets through the bi-directional tunnel, removes the outer header and forwards the packets to the mobile node.

Likewise, any packet that the mobile node sends to any correspondent node will be received by the MAG and will be sent to the selected LMA through the bi-directional tunnel. The LMA, after receiving the packet, removes the other header and routes the packet to the destination.

As previously described, there are situations where an LMA selected by the MAG is not capable of serving the mobile node. A mechanism is needed where the selected LMA can redirect the request message to an alterative LMA which may be capable of serving the mobile node.

In one embodiment of the invention, IP session establishment can be redirected from an original LMA to an alternative LMA. According to an exemplary embodiment of the invention, the mechanism can be applied to the PMIPv6 protocol.

FIG. 1 illustrates an example embodiment of a communication system according to the present invention. The depicted system includes several mobile nodes, several MAGs, and several LMAs. According to an embodiment of the invention, a new type of MAG is introduced. The MAG is capable of sending a PBU message to a LMA with a redirection mobility option, which indicates to a LMA that the MAG supports redirection functionality. According to certain embodiments of the invention, the MAG is capable of sending a PBU message to an internet protocol address of an original LMA. In certain embodiments, the internet protocol address of the original LMA can be an anycast internet protocol address, as will be discussed in more detail. The MAG is also capable of receiving a PBA message with a redirection mobility option, which indicates to the MAG that a redirection took place from an original LMA to a redirected LMA. According to certain embodiments, the PBA message can be received from an internet protocol address of the redirected LMA. In certain embodiments, the internet protocol address of the redirected LMA can be a unicast internet protocol address. According to these embodiments, the unicast internet protocol address can be an IPv4 address or an IPv6 address. If the MAG receives a PBA message with a redirection mobility option, the MAG is capable of updating its own binding cache information to reflect the internet protocol address of the redirected LMA. Examples of the MAG are illustrated in FIG. 1 as MAGs 120, 121, and 122.

Furthermore, according to an embodiment of the invention, a new type of LMA is introduced. The LMA can be deployed as a cluster of separate LMAs, a multi-bladed LMA, or a combination of both. According to the example embodiment depicted in FIG. 1, the LMA is deployed as a cluster of separate LMAs. However, one of ordinary skill in the art would readily understand that this is merely an exemplary embodiment of the invention, and that in other embodiments, the LMA can be deployed as a multi-bladed LMA, or a combination of clusters of separate LMAs and multi-bladed LMAs.

According to the embodiment of the invention, the new type of LMA can include a frontend LMA and one or more service LMAs. In certain embodiments, the new type of LMA can be a multi-bladed LMA, where the frontend LMA can be one of the LMA blades of the multi-bladed LMA. The frontend LMA may be aware of the one or more service LMAs. According to certain embodiments of the invention, the frontend LMA is aware of one or more service LMAs through the use of anycast internet protocol addressing. The frontend LMA is capable of receiving a PBU message sent to an internet protocol address of the frontend LMA, selecting a service LMA from the one or more service LMAs, and redirecting the PBU message to the selected service LMA in order for the LMA to process the PBU message. In certain embodiments, the internet protocol address of the frontend LMA can be an anycast internet protocol address, as will be discussed in more detail. Examples of a frontend LMA are illustrated in FIG. 1 as frontend LMAs 130, 131, and 132.

The service LMA is capable of receiving a PBU message which was originally sent from a MAG to a frontend LMA, and which was redirected to the service LMA from the frontend LMA. The service LMA is capable of processing the PBU message and sending a PBA message back to the MAG with a redirection mobility option, which indicates to the MAG that a redirection took place. The PBA message can be sent from an internet protocol address of the service LMA.

In certain embodiments, the internet protocol address of the service LMA can be a unicast internet protocol address. According to these embodiments, the unicast internet protocol address can be an IPv4 address or an IPv6 address. Examples of a service LMA are illustrated in FIG. 1 as service LMAs 140, 141, 142, 143, 144 and 145.

One of ordinary skill in the art would readily understand that the depicted system is capable of having any number of mobile nodes, MAGs, and/or LMAs. Accordingly, one of ordinary skill in the art would readily understand that the system as illustrated in FIG. 1 is an example of a communication system according to an embodiment of the present invention, and does not limit the scope of the present invention to a particular number of mobile nodes, MAGs, and/or LMAs. Furthermore, one of ordinary skill in the art would readily understand that the system of FIG. 1 may be capable of having other components, and that other components not relevant to the illustrated embodiment of the invention are not shown here.

Figure 2:
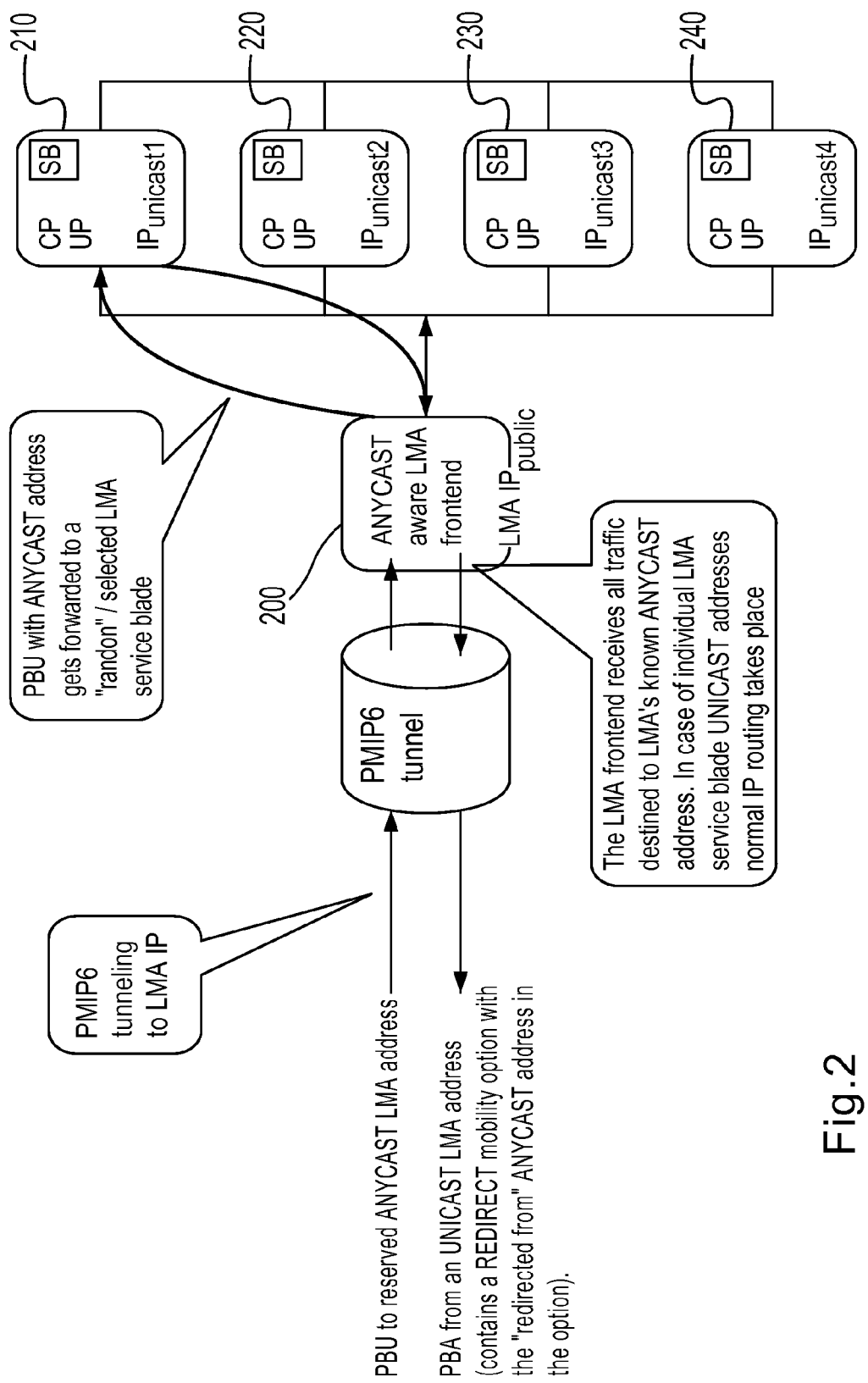
FIG. 2 illustrates another example embodiment of a communication system according to the present invention.

FIG. 2 illustrates an example of a LMA, according to an embodiment of the invention. According to this embodiment, the LMA can include the frontend LMA 200, and service LMAs 210, 220, 230, and 240. The frontend LMA 200 is capable of receiving a PBU message from a MAG (not shown) through a PMIPv6 tunnel, as depicted in FIG. 2.

According to an embodiment of the invention, the frontend LMA 200 may be aware of anycast internet protocol addressing. As one of ordinary skill in the art would readily understand, anycast internet protocol addressing is a network addressing and routing scheme whereby messages are routed to the nearest or best destination as viewed by the routing topology. According to the embodiment of the invention, the anycast internet protocol addressing can utilize a Mobile IPv6 defined anycast internet protocol address, which will be discussed below in more detail. However, one of ordinary skill in the art would readily understand that embodiments of the invention are not limited to the Mobile IPv6 defined anycast internet protocol address, and that certain embodiments of the invention can utilize other types of anycast internet protocol addressing. For example, certain embodiments of the invention can utilize a new PMIPv6 anycast internet protocol address.

According to the Mobile IPv6 protocol, a new type of internet protocol address is defined, known as an anycast internet protocol address, that allows a packet to be routed to one of a number of different nodes all responding to the same address. The anycast internet protocol address can be assigned to one or more network interfaces (typically on different nodes), with the network delivering each packet addressed to this address to the "nearest" interface based on the notion of "distance" determined by the routing protocols in use. For example, an anycast internet protocol address can be used to allow nodes to access one of a collection of servers providing a well-known service, without manual configuration in each mode of the list of servers. Alternatively, an anycast internet protocol address can be used in a source route to force routing through a specific internet service provider (ISP), without limiting routing to a single specific router providing access to that ISP.

According to an embodiment of the invention, the frontend LMA 200 receives a PBU which includes a redirect mobility option, and which is sent to a reserved anycast internet protocol address of the front end LMA 200. According to the depicted embodiment, the redirect mobility option can include an undefined internet protocol address. As described above, the frontend LMA 200 is capable of receiving all traffic destined to the known anycast internet protocol address of the frontend LMA 200. The frontend LMA 200 selects a service LMA to handle the PBU message. For example, according to the depicted embodiment, the frontend LMA 200 selects service LMA 210. While in the illustrated embodiment, service LMA 210 is selected, one of ordinary skill in the relevant art would appreciate that any of service LMAs 210, 220, 230, and 240 can be selected by LMA 200. According to certain embodiments of the invention, the selection of a service LMA may be based on load information, hash of an MN-identifier, which identifies the mobile node, etc.

Furthermore, according to an embodiment of the invention, the frontend LMA 200 then forwards the PBU message to the selected service LMA 210. The selected service LMA 210 then processes the PBU message and generates a PBA message. According to the embodiment, the PBA message can be sent from a unicast internet protocol address of the service LMA 210 to the MAG (not shown). According to the embodiment, the PBA message can include a redirect mobility option. Furthermore, according to the embodiment, the redirect mobility option can include the anycast internet protocol address of the frontend LMA 200. According to the embodiment, the PBA message is routed by the service LMA 210 to the MAG (not shown) through normal IP routing. According to the embodiment, the unicast internet protocol address can be an IPv4 address or an IPv6 address.

One of ordinary skill in the art would readily understand that the new type of LMA can be deployed in a variety of configurations, and that the deployment of the new type of LMA, as depicted in FIG. 2, is merely an exemplary deployment. Furthermore, while the frontend LMA 200, depicted in FIG. 2, is configured to receive all traffic via an anycast internet protocol address, according to an embodiment of the invention, one of ordinary skill in the art would readily understand that the redirection mechanism, as depicted in FIG. 2 is also applicable for non-anycast internet protocol addresses, and that the frontend LMA 200 can be configured to receive all traffic via an non-anycast internet protocol address, such as a unicast internet protocol address. Furthermore, while the PBA message is shown in FIG. 2 as being routed via the frontend LMA, one of ordinary skill in the art would readily understand that that is merely an exemplary embodiment, and that in other embodiments of the invention, the PBA message may be routed directly from the service LMA to the MAG (not shown).

Figure 3:
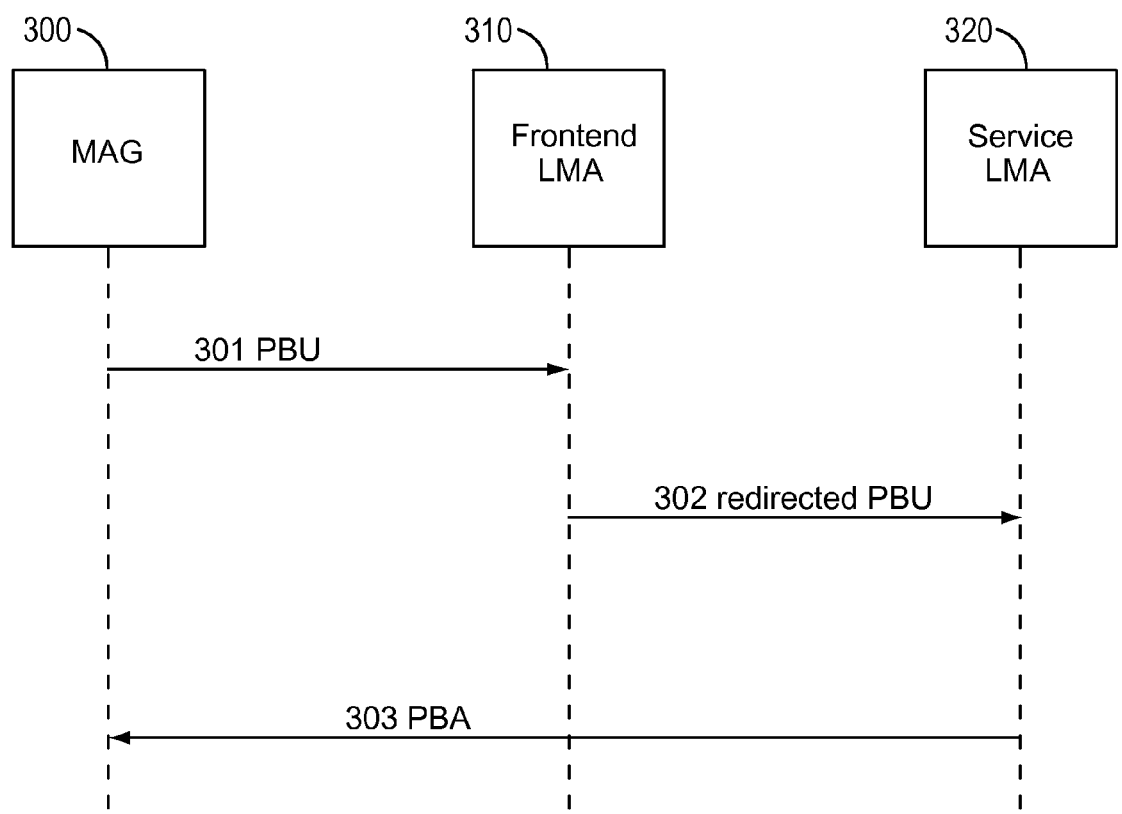
FIG. 3 illustrates a signaling flow, in accordance with another embodiment of the present invention.

FIG. 3 is a signaling diagram of a method for enabling redirection of an IP session establishment, in accordance with another embodiment of the invention.

At step 301, MAG 300 sends a PBU message to frontend LMA 310. The PBU message can include a redirect mobility option which can indicate that the MAG 300 supports redirection functionality. The redirect mobility option can be included in an initial PBU or any binding refreshing PBU. According to certain embodiments, the redirect mobility option of the PBU message can include an undefined address. For example, the redirect mobility option of the PBU message can include the address 0.0.0.0 for the IPv4 protocol and 0::0 for the IPv6 protocol.

According to an embodiment, the PBU message can be sent to an internet protocol address of the frontend LMA 310. In certain embodiments, the internet protocol address of the front end LMA 310 is an anycast internet protocol address. The anycast internet protocol address can be a Mobile IPv6 defined anycast internet protocol address. Furthermore, the anycast internet protocol address can also be a PMIPv6 anycast internet protocol address. However, according to another embodiment of the invention, the internet protocol address of the front end LMA 310 can be an unicast internet protocol address.

At step 302, the frontend LMA 310 selects service LMA 320 and redirects the PBU message to the service LMA 320. According to certain embodiments, the frontend LMA 310 may only redirect the PBU message if the frontend LMA 310 supports the redirection functionality and the received PBU message contains the redirect mobility option. According to certain embodiments, if the redirection takes place during an established mobility session, then the frontend LMA 310 may clean up and remove the mobility session after redirecting the PBU message to the service LMA 320.

According to an embodiment, if the frontend LMA 310 does not support the redirection functionality, then the frontend LMA 310 can ignore the redirect mobility option received in the PBU message.

At step 303, the service LMA 320 sends a PBA message to the MAG 300, where the PBA message is sent from the internet protocol address of the service LMA 320. The PBA message can include a redirect mobility option which can indicate that redirection has occurred. The redirect mobility option can include an address of the frontend LMA 310. The internet protocol address of the front end LMA 310 can be an anycast internet protocol address. The anycast internet protocol address can be a Mobile IPv6 defined anycast internet protocol address. Furthermore, in other embodiments, the anycast internet protocol address can be a PMIPv6 anycast internet protocol address. However, according to other embodiments of the invention, the internet protocol address of the front end LMA 310 is an unicast internet protocol address.

In am embodiment, the LMA 320 sends the PBA message to the front end LMA 310, which subsequently forwards the PBA message to the MAG 300. In an alternative embodiment, the LMA 320 sends the PBA message directly to the MAG 300, bypassing the front end LMA 310.

The service LMA 320 may not, in all circumstances, include the redirect mobility option in the PBA message. For example the service LMA 320 may not include the redirect mobility option in the PBA message, if the MAG 300 did not indicate the redirect mobility option in the corresponding PBU message. Thus, the service LMA 320 may not include the redirect mobility option unsolicited even if the MAG 300 had earlier indicated support for redirection functionality.

If the MAG 300 receives a PBA message that contains the redirect mobility option from the service LMA 320, without first including the redirect mobility option in the corresponding PBU message, the MAG 300 can treat the PBA as if the binding update failed and log the event.

However, if the MAG 300 receives a PBA message that contains the redirect mobility option from the service LMA 320, and the MAG 300 included the redirect mobility option in the corresponding PBU message, then, the MAG can perform the following steps. The first step is to check if the redirect mobility option contains the internet protocol address of the frontend LMA 310 (i.e. the internet protocol address of the LMA to whom the MAG 300 originally sent the PBU message). If the check fails, then the MAG 300 can treat the PBA message as if the binding update failed and log the event. The second step is to update the Binding Update List to correspond to the LMA IP address where the newly received PBA message came from.

After receiving the PBA message, and confirming that the PBA message correctly includes the redirect mobility option, the MAG 300 can send subsequent PBU messages, and user traffic, to the service LMA 320. If the MAG includes the redirect mobility option in a subsequent PBU message, the service LMA 320 can redirect the subsequent PBU message to an alternative service LMA, according to the signaling described above.

The redirect mobility option can have the alignment requirement of 4n+2, and can have the format shown below:

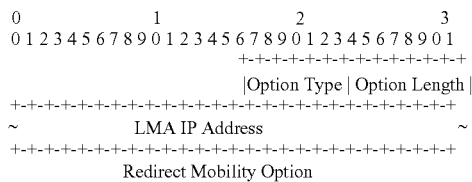

Redirect Mobility Option

The option type can, in certain embodiments, be an 8-bit identifier set to TBD 1. The option length can be an 8-bit unsigned integer, representing the length of the Redirect mobility option in octets, excluding the Option Type and Length fields. If the LMA IP address included in the option is an IPv4 address, the Option Length can be set to 4, and if the LMA IP address included in the option is an IPv6 address, then the Option Length is set to 16. The LMA IP address can be the internet protocol address of the frontend LMA or an undefined address. If the LMA IP address is the internet protocol address of the frontend LMA, the internet protocol address can be an anycast internet protocol address. The anycast internet protocol address can be a Mobile IPv6 defined anycast internet protocol address. Furthermore, the anycast internet protocol address can be a PMIPv6 anycast internet protocol address. However, the internet protocol address can be an unicast internet protocol address, as opposed to an anycast internet protocol address.

The redirection mechanism is possible between MAGs and LMAs that have an existing security association ("SA") set up. It is the responsibility of the frontend LMA 310 that receives the PBU message from the MAG 300 to redirect the MAG 300 to a service LMA 320 whom the MAG 300 already has a SA set up with. Furthermore, the frontend LMA 310 and the service LMA 320 can have a prior agreement and an established trust relationship to perform redirection.

The PBU/PBA exchange can be stateless.

Figure 4:
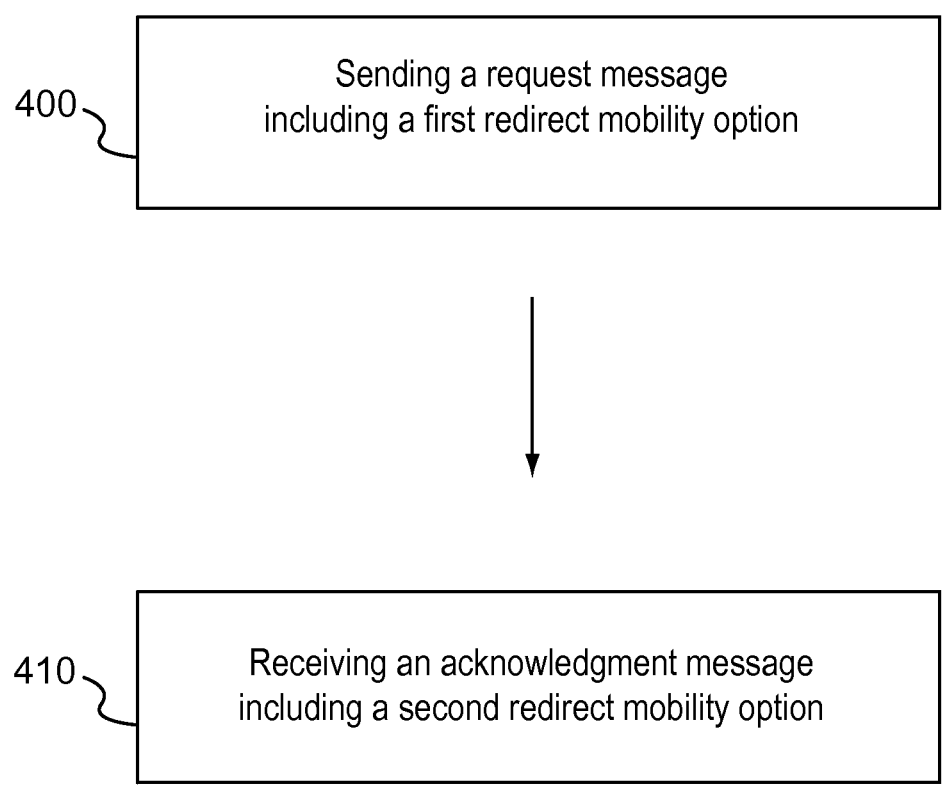
FIG. 4 illustrates a method, in accordance with an embodiment of the present invention.

FIG. 4 is a flow diagram of a method for enabling redirection of an IP session establishment, in accordance with another embodiment of the invention. The method can involve a MAG, a frontend LMA, and a service LMA. However, one of ordinary skill in the art would readily understand that this is merely an exemplary embodiment of the method for enabling redirection of an IP session establishment, and that the method could be applied to other network elements.

At step 400 the MAG sends a request message to the frontend LMA. The request message can include a first redirect mobility option which indicates that the MAG supports redirection functionality, and the request message is sent to an internet protocol address of the frontend LMA. At step 410, the MAG receives an acknowledgment message from the service LMA. The acknowledgment message can include a second redirect mobility option which indicates that the request message was redirected by the frontend LMA to the service LMA, and the acknowledgment message is received from an internet protocol address of the service LMA.

The first redirect mobility option can include an undefined internet protocol address, and the second redirect mobility option can include the internet protocol address of the frontend LMA. In these embodiments, the internet protocol address can be an anycast internet protocol address, such as an IPv6 anycast internet protocol address or a PMIPv6 internet protocol address. In certain embodiments, the request message can be sent to an anycast internet protocol address of the frontend LMA.

The acknowledgment message can be received from an unicast internet protocol address of the service LMA, such as an IPv4 address or an IPv6 address.

The method can include the additional step of the MAG rejecting the acknowledgment message if the acknowledgment message includes the second redirect mobility option and the request message does not include the first redirect mobility option.

The method can include the additional steps of the MAG checking if the second redirect mobility option includes the internet protocol address of the frontend LMA, rejecting the acknowledgment message if the second redirect mobility option does not include the internet protocol address of the frontend LMA, updating a binding update list to correspond to the internet protocol address of the service LMA, and sending subsequent request messages, and user traffic, to the service LMA.

The request message can be a PBU message, and the acknowledgment message can be a PBA message.

Figure 5:
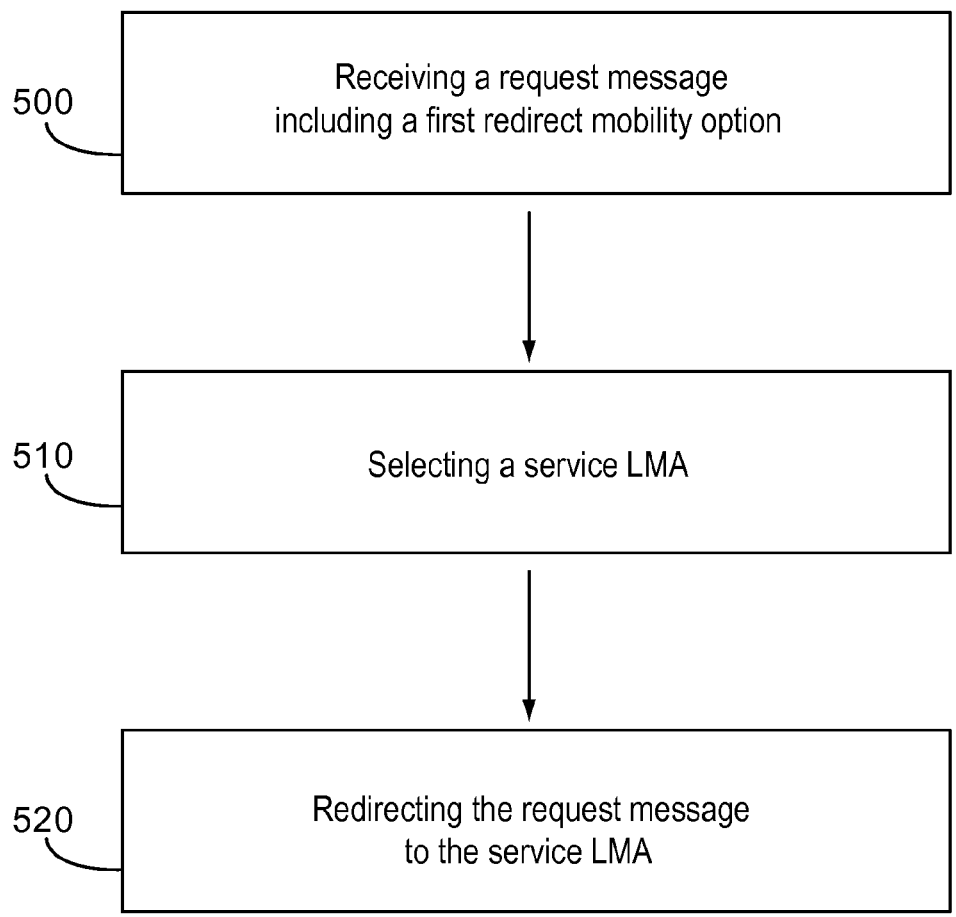
FIG. 5 illustrates a method, in accordance with another embodiment of the present invention.

FIG. 5 is another flow diagram of a method for enabling redirection of an IP session establishment, in accordance with another embodiment of the invention. However, one of ordinary skill in the art would readily understand that this is merely an exemplary embodiment of the method for enabling redirection of an IP session establishment, and that the method could be applied to other network elements.

The method can involve a MAG, a frontend LMA, and a service LMA. At step 500, the frontend LMA element receives a request message from a MAG. The request message can include a first redirect mobility option which indicates that the MAG supports redirection functionality, and the request message is received at an internet protocol address of the frontend LMA. At step 510, the frontend LMA selects the service LMA. At step 520 the frontend LMA redirects the request message to the service LMA.

The first redirect mobility option can include an undefined internet protocol address, and the request message can be received at an anycast internet protocol address of the frontend LMA, such as an IPv6 anycast internet protocol address or an PMIPv6 internet protocol address.

The method can include the additional step of the frontend LMA receiving an acknowledgment message from the service LMA, where the acknowledgment message includes a second redirect mobility option which indicates that the request message was redirected by the frontend LMA to the service LMA, and where the acknowledgment message is received from an internet protocol address of the service LMA. In these embodiments, the method can include the additional step of the frontend LMA sending the acknowledgment message to the MAG.

The second redirect mobility option can include the internet protocol address of the frontend LMA. The internet protocol address can be an anycast internet protocol address, such as an IPv6 anycast internet protocol address or an PMIPv6 internet protocol address. In these embodiments the acknowledgment message can be received from an unicast internet protocol address of the service LMA, such as an IPv4 address or an IPv6 address.

The method can include the additional steps of the frontend LMA ignoring the redirect mobility option received in the request message when the frontend LMA does not support redirection functionality, and cleaning and removing mobility session information after redirecting the request message to the service LMA. In certain embodiments, the selecting the service LMA may be based on factors such as load information, a hash of a mobile node identifier, etc.

The request message can be a PBU message, and the acknowledgment message can be a PBA message.

Figure 6:
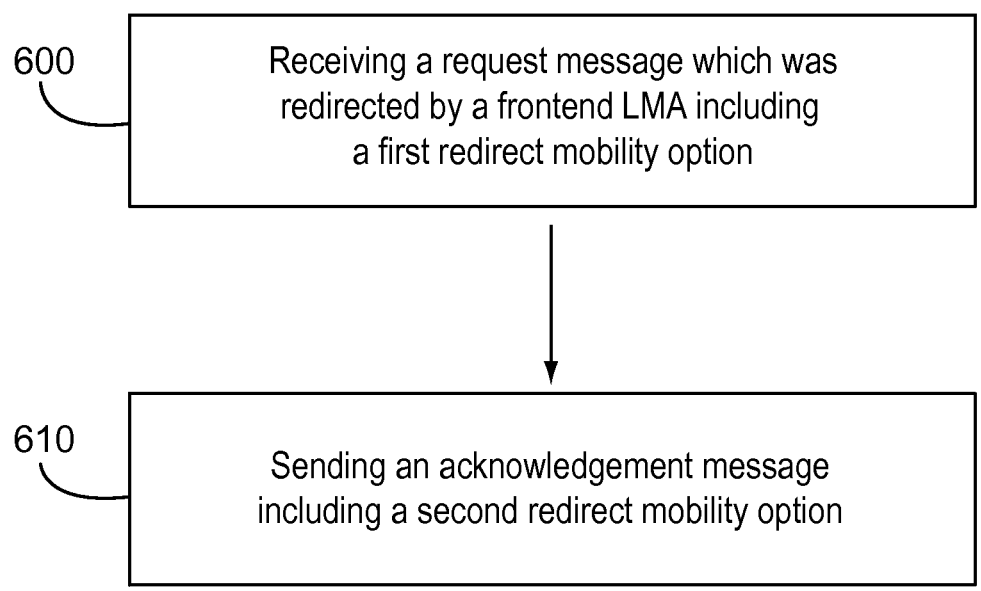
FIG. 6 illustrates a method, in accordance with another embodiment of the present invention.

FIG. 6 is another flow diagram of a method for enabling redirection of an IP session establishment, in accordance with another embodiment of the invention. The method can involve a MAG, a frontend LMA, and a service LMA. However, one of ordinary skill in the art would readily understand that this is merely an exemplary embodiment of the method for enabling redirection of an IP session establishment, and that the method could be applied to other network elements.

At step 600, the service LMA receives a request message which was originally sent by the MAG to an internet protocol address of the frontend LMA, and redirected by the frontend LMA. The request message can include a first redirect mobility option which indicates that the MAG supports redirection functionality. At step 610, the service LMA sends an acknowledgment message to the MAG. According to the embodiment of the invention, the acknowledgment message can include a second redirect mobility option which indicates that the request message was redirected by the frontend LMA to the service LMA, and the acknowledgment message can be sent from an internet protocol address of the service LMA.

The first redirect mobility option can include an undefined internet protocol address, and the second redirect mobility option can include the internet protocol address of the frontend LMA. The internet protocol address can be an anycast internet protocol address, such as an IPv6 anycast internet protocol address or a PMIPv6 internet protocol address. In certain embodiments, the request message can be originally sent to an anycast internet protocol address of the frontend LMA.

The acknowledgment message can be sent from an unicast internet protocol address of the service LMA, such as an IPv4 address or an IPv6 address.

The service LMA can send the acknowledgment message to the MAG via the frontend LMA. In another embodiment of the invention, the service LMA can send the acknowledgement message to the MAG while bypassing the frontend LMA.

The request message can be a PBU message, and the acknowledgment message can be a PBA message.

Figure 7:
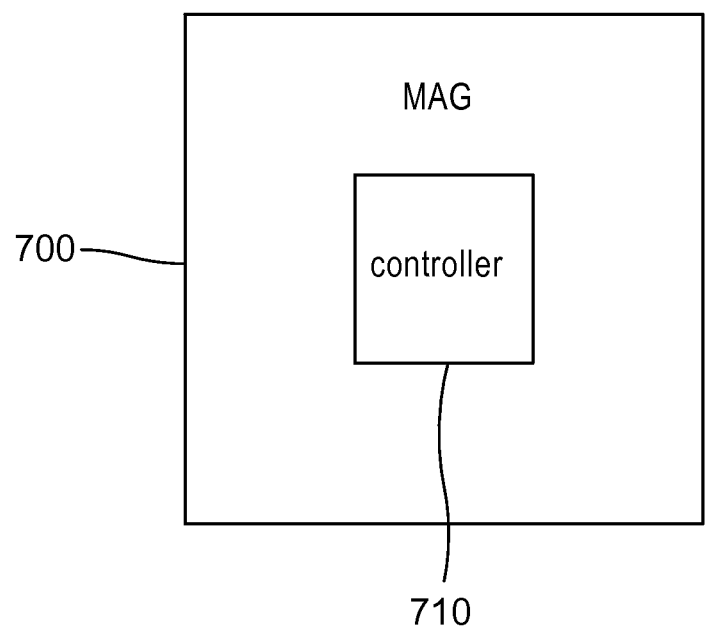
FIG. 7 illustrates an example embodiment of an apparatus according to the present invention.

FIG. 7 is a block diagram of a MAG 700, in accordance with another embodiment of the invention. The depicted MAG 700 includes a controller 710. In certain embodiments the MAG 700 corresponds to the MAG in the system of FIG. 1.

The controller 710 can be configured to send a request message to a frontend LMA. The request message can include a first redirect mobility option which indicates that the MAG 700 supports redirection functionality. The controller 710 can be further configured to send the request message to an internet protocol address of the frontend LMA. The controller 710 can be further configured to receive an acknowledgment message from a service LMA. The acknowledgment message can include a second redirect mobility option which indicates that the request message was redirected by the frontend LMA to the service LMA. The acknowledgment message can be from an internet protocol address of the service LMA.

The first redirect mobility option can include an undefined internet protocol address, and the second redirect mobility option can include the internet protocol address of the frontend LMA. In these embodiments, the internet protocol address can be an anycast internet protocol address, such as an IPv6 anycast internet protocol address or a PMIPv6 internet protocol address. In certain embodiments, the controller 710 can be configured to send the request message to an anycast internet protocol address of the frontend LMA.

The controller 710 can be configured to receive the acknowledgment message from an unicast internet protocol address of the service LMA, such as an IPv4 address or an IPv6 address.

The controller 710 can be further configured to reject the acknowledgment message if the acknowledgment message includes the second redirect mobility option and the request message does not include the first redirect mobility option.

The controller 710 can be further configured to check if the second redirect mobility option includes the internet protocol address of the frontend LMA, reject the acknowledgment message if the second redirect mobility option does not include the internet protocol address of the frontend LMA, update a binding update list to correspond to the internet protocol address of the service LMA, and send subsequent request messages, and user traffic, to the service LMA.

The request message can be a PBU message, and the acknowledgment message can be a PBA message.

Figure 8:
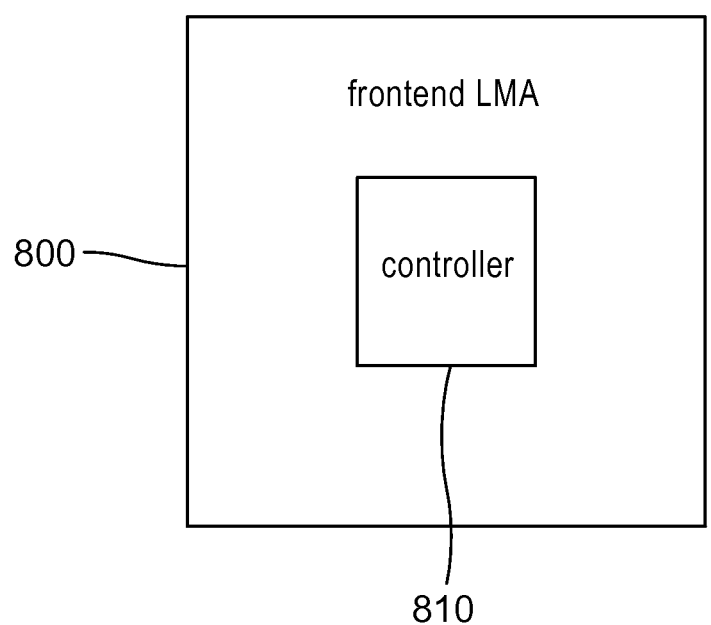
FIG. 8 illustrates another example embodiment of an apparatus according to the present invention.

FIG. 8 is a block diagram of a frontend LMA 800, in accordance with another embodiment of the invention. The depicted frontend LMA 800 includes a controller 810. In certain embodiments the frontend LMA 800 corresponds to the frontend LMA in the system of FIG. 1.

The controller 810 can be configured to receive a request message from a MAG. The request message can include a first redirect mobility option which indicates that the MAG supports redirection functionality. The controller 810 can be further configured to receive the request message at an internet protocol address of the frontend LMA 800. The controller 810 can be further configured to select a service LMA, and redirect the request message to the selected service LMA.

The first redirect mobility option can include an undefined internet protocol address, and the controller can be configured to receive the request message at an anycast internet protocol address of the frontend LMA 800, such as an IPv6 anycast internet protocol address or an PMIPv6 internet protocol address.

The controller 810 can be further configured to receive an acknowledgment message from the service LMA. The acknowledgment message can include a second redirect mobility option which indicates that the request message was redirected by the frontend LMA 800 to the service LMA. The controller 810 can be further configured to receive the acknowledgment message from an internet protocol address of the service LMA. The controller 810 can be further configured to send the acknowledgment message to the MAG.

The second redirect mobility option can include the internet protocol address of the frontend LMA 800. In these embodiments, the internet protocol address can be an anycast internet protocol address, such as an IPv6 anycast internet protocol address or an PMIPv6 internet protocol address. The controller 810 can be further configured to receive the acknowledgment message from an unicast internet protocol address of the service LMA, such as an IPv4 address or an IPv6 address.

The controller 810 can be further configured to ignore the redirect mobility option received in the request message when the frontend LMA 800 does not support redirection functionality, and to clean and remove mobility session information after redirecting the request message to the service LMA. Selecting the service LMA can be based on factors such as load information, a hash of a mobile node identifier, etc.

The request message can be a PBU message, and the acknowledgment message can be a PBA message.

Figure 9:
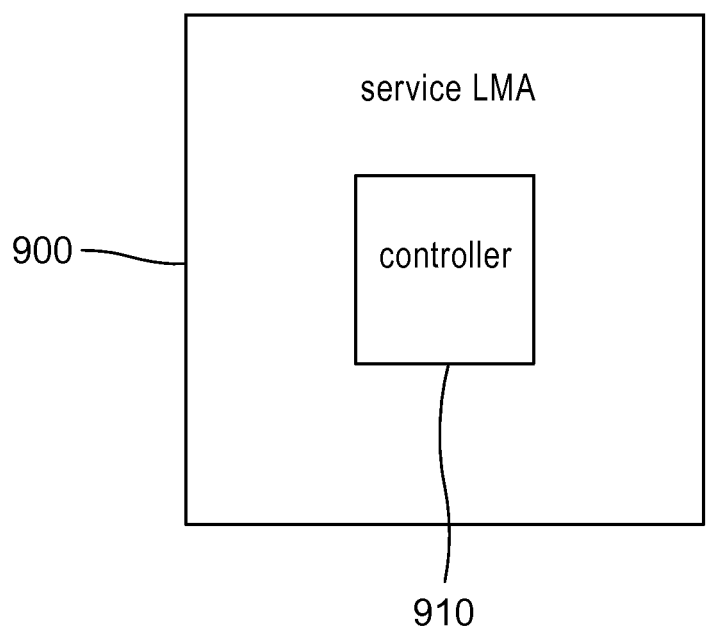
FIG. 9 illustrates another example embodiment of an apparatus according to the present invention.

FIG. 9 is a block diagram of a service LMA 900, in accordance with another embodiment of the invention. The depicted service LMA 900 includes a controller 910. In certain embodiments service LMA 900 corresponds to the service LMA in the system of FIG. 1.

The controller 910 can be configured to receive a request message which was originally sent by a MAG to an internet protocol address of a frontend LMA, and redirected by the frontend LMA. The request message can include a first redirect mobility option which indicates that the MAG supports redirection functionality. The controller 910 can be configured to send an acknowledgment message to the MAG. The acknowledgment message can include a second redirect mobility option which indicates that the request message was redirected by the frontend LMA to the service LMA 900. The controller 910 can be configured to send the acknowledgment message from an internet protocol address of the service LMA 900.

The first redirect mobility option can include an undefined internet protocol address, and the second redirect mobility option can include the internet protocol address of the frontend LMA. In these embodiments, the internet protocol address can be an anycast internet protocol address, such as an IPv6 anycast internet protocol address or a PMIPv6 internet protocol address. In certain embodiments, the request message can be originally sent to an anycast internet protocol address of the frontend LMA.

The controller 910 can be configured to send the acknowledgment message from an unicast internet protocol address of the service LMA 900, such as an IPv4 address or an IPv6 address.

The controller 910 can be configured to send the acknowledgment message to the MAG via the frontend LMA.

The request message can be a PBU message, and the acknowledgment message can be a PBA message.

The steps of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    sending, at a mobile access gateway, a request message to a frontend local mobility anchor, wherein the request message comprises a first redirect mobility option which indicates that the mobile access gateway supports redirection functionality, and wherein the request message is sent to an internet protocol address of the frontend local mobility anchor; and
    receiving, at the mobile access gateway, an acknowledgment message from a service local mobility anchor, wherein the acknowledgment message comprises a second redirect mobility option which indicates that the request message was redirected by the frontend local mobility anchor to the service local mobility anchor, wherein the acknowledgment message is received from an internet protocol address of the service local mobility anchor.

2. The method of claim 1, further comprising rejecting, at the mobile access gateway the acknowledgment message if the acknowledgment message comprises the second redirect mobility option and the request message does not comprise the first redirect mobility option.

3. The method of claim 1, further comprising:
    checking, at the mobile access gateway, if the second redirect mobility option comprises the internet protocol address of the frontend local mobility anchor;
    rejecting, at the mobile access gateway, the acknowledgment message if the second redirect mobility option does not comprise the internet protocol address of the frontend local mobility anchor; and
    updating, at the mobile access gateway, a binding update list to correspond to the internet protocol address of the service local mobility anchor.

4. The method of claim 1, further comprising sending, at the mobile access gateway, subsequent request messages, and user traffic, to the third network element.

5. A method, comprising:
  receiving a request message from a mobile access gateway, at a frontend local mobility anchor, wherein the request message comprises a first redirect mobility option which indicates that the mobile access gateway supports redirection functionality, and wherein the request message is received at an internet protocol address of the frontend local mobility anchor;
  selecting a service local mobility anchor;
  redirecting the request message to the service local mobility anchor;
  receiving, at the frontend local mobility anchor, an acknowledgment message from the service local mobility anchor, wherein the acknowledgment message comprises a second redirect mobility option which indicates that the request message was redirected by the frontend local mobility anchor to the service local mobility anchor, and wherein the acknowledgment message is received from an internet protocol address of the service local mobility anchor; and
  sending, at the frontend local mobility anchor, the acknowledgment message to the mobile access gateway.

6. The method of claim 5, further comprising ignoring, at the frontend local mobility anchor, the redirect mobility option received in the request message when the frontend local mobility anchor does not support redirection functionality.

7. The method of claim 5, further comprising cleaning, at the frontend local mobility anchor, and removing mobility session information after redirecting the request message to the service local mobility anchor.

8. The method of claim 5, wherein the selecting the service local mobility anchor comprises selecting the service local mobility anchor based on load information.

9. The method of claim 5, wherein the selecting the service local mobility anchor comprises selecting the service local mobility anchor based on a hash of a mobile node identifier.

10. A method, comprising:
  receiving a request message which was originally sent by a mobile access gateway to an internet protocol address of a frontend local mobility anchor, and redirected by the frontend local mobility anchor, at a service local mobility anchor, wherein the request message comprises a first redirect mobility option which indicates that the mobile access gateway supports redirection functionality; and
  sending, at the service local mobility anchor, an acknowledgment message to the mobile access gateway, wherein the acknowledgment message comprises a second redirect mobility option which indicates that the request message was redirected by the frontend local mobility anchor to the service local mobility anchor, and wherein the acknowledgment message is sent from an internet protocol address of the service local mobility anchor.

11. The method of claim 10, wherein the sending the acknowledgment message to the mobile access gateway can include sending the acknowledgment message via the frontend local mobility anchor.

12. The method of claim 1, wherein the first redirect mobility option comprises an undefined internet protocol address, and wherein the second redirect mobility option comprises the internet protocol address of the frontend local mobility anchor.

13. The method of claim 1, wherein the internet protocol address is an anycast internet protocol address.

14. An apparatus, comprising:
  a controller of a mobile access gateway configured to send a request message to a frontend local mobility anchor, wherein the request message can include a first redirect mobility option which indicates that the apparatus supports redirection functionality, and wherein the request message is sent to an internet protocol address of the frontend local mobility anchor,
  wherein the controller is further configured to receive an acknowledgment message from a service local mobility anchor, wherein the acknowledgment message can include a second redirect mobility option which indicates that the request message was redirected by the frontend local mobility anchor to the service local mobility anchor, and wherein the acknowledgment message is received from an internet protocol address of the service local mobility anchor.

15. The apparatus of claim 14, wherein the controller is further configured to reject the acknowledgment message if the acknowledgment message comprises the second redirect mobility option and the request message does not comprise the first redirect mobility option.

16. The apparatus of claim 14, wherein the controller is further configured to check if the second redirect mobility option comprises the internet protocol address of the frontend local mobility anchor,
  wherein the controller is further configured to reject the acknowledgment message if the second redirect mobility option does not comprise the internet protocol address of the frontend local mobility anchor, and
  wherein the controller is further configured to update a binding update list to correspond to the internet protocol address of the service local mobility anchor.

17. The apparatus of claim 14, wherein the controller is further configured to send subsequent request messages, and user traffic, to the service local mobility anchor.

18. An apparatus, comprising:
  a controller of a frontend local mobility anchor configured to receive a request message from a mobile access gateway, wherein the request message can include a first redirect mobility option which indicates that the mobile access gateway supports redirection functionality, and wherein the request message is received at an internet protocol address of the apparatus,
  wherein the controller is further configured to select a service local mobility anchor,
  wherein the controller is further configured to redirect the request message to the service local mobility anchor, and
  wherein the controller is further configured to receive, at the frontend local mobility anchor, an acknowledgment message from the service local mobility anchor, wherein the acknowledgment message comprises a second redirect mobility option which indicates that the request message was redirected by the frontend local mobility anchor to the service local mobility anchor, and wherein the acknowledgment message is received from an internet protocol address of the service local mobility anchor.

19. The apparatus of claim 18, wherein the controller is further configured to ignore the redirect mobility option received in the request message when the apparatus does not support redirection functionality.

20. The apparatus of claim 18, wherein the controller is further configured to clean and remove mobility session information after redirecting the request message to the service local mobility anchor.

21. The apparatus of claim 18, wherein the controller is further configured to select the service local mobility anchor based on load information.

22. The apparatus of claim 18, wherein the controller is further configured to select the service local mobility anchor based on a hash of a mobile node identifier.

23. An apparatus, comprising:
a controller of a service local mobility anchor configured to receive a request message which was originally sent by a mobile access gateway to an internet protocol address of a frontend local mobility anchor, and redirected by the frontend local mobility anchor, wherein the request message can include a first redirect mobility option which indicates that the mobile access gateway supports redirection functionality,
wherein the controller is further configured to send an acknowledgment message to the mobile access gateway, wherein the acknowledgment message can include a second redirect mobility option which indicates that the request message was redirected by the frontend local mobility anchor to the apparatus, and wherein the acknowledgment message is sent from an internet protocol address of the apparatus.

24. The apparatus of claim 23, wherein the controller is further configured to send the acknowledgment message via the frontend local mobility anchor.

25. The apparatus of claim 14, wherein the first redirect mobility option comprises an undefined internet protocol address, and wherein the second redirect mobility option comprises the internet protocol address of the frontend local mobility anchor.

26. The apparatus of claim 14, wherein the internet protocol address is an anycast internet protocol address.

* * * * *